United States Patent [19]
Leith

[11] 3,980,186
[45] Sept. 14, 1976

[54] SILAGE HANDLING APPARATUS

[75] Inventor: Duane A. Leith, Claypool, Ind.

[73] Assignee: Supreme Farmstead Equipment, Inc., Silver Lake, Ind.

[22] Filed: Aug. 18, 1975

[21] Appl. No.: 605,396

[52] U.S. Cl. .......................................... 214/17 DB
[51] Int. Cl.² ........................................ B65G 65/38
[58] Field of Search .................. 214/17 DB, 17 CB; 302/56; 222/404, 405

[56] References Cited
UNITED STATES PATENTS

| | | | |
|---|---|---|---|
| 3,075,657 | 1/1963 | Hazen | 214/17 DB |
| 3,231,106 | 1/1966 | Bruecker | 214/17 DB |
| 3,438,517 | 4/1969 | Steffen | 214/17 CB |
| 3,794,190 | 2/1974 | Lambert | 214/17 DB |

*Primary Examiner*—Trygve M. Blix
*Assistant Examiner*—Charles E. Frankfort
*Attorney, Agent, or Firm*—Mason, Kolehmainen, Rathburn & Wyss

[57] ABSTRACT

Apparatus for handling silage material in cylindrical storage bins such as silos and the like comprising a first horizontally stationary ring forming a track around the inside periphery of the silo wall and mounted for vertical movement therein. A second ring is supported for rotation relative to the first ring and includes blades for engaging the material in the silo below the track forming a peripheral trench in the material around the inside wall surface of the silo. One or more radial arm assemblies extend radially outward of the center of the silo and each includes drive apparatus adjacent the outer end for drivingly engaging the first and second rings for rotating the arm assembly around the silo in one direction and driving the second ring around the silo in an opposite direction. The arm assemblies include an endless chain extending between the center of the silo and the outer end portion with blades for engaging the silage material to move the material in a radial direction toward and away from the peripheral trench formed in the silage material below the second ring.

10 Claims, 5 Drawing Figures

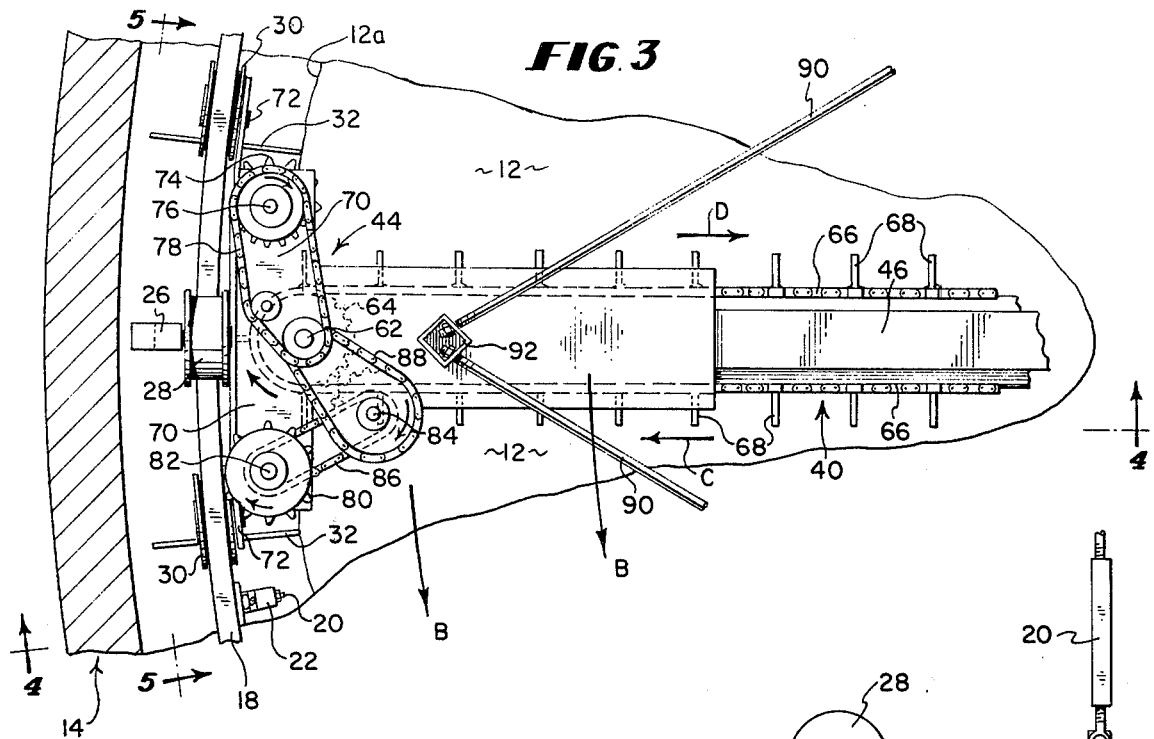
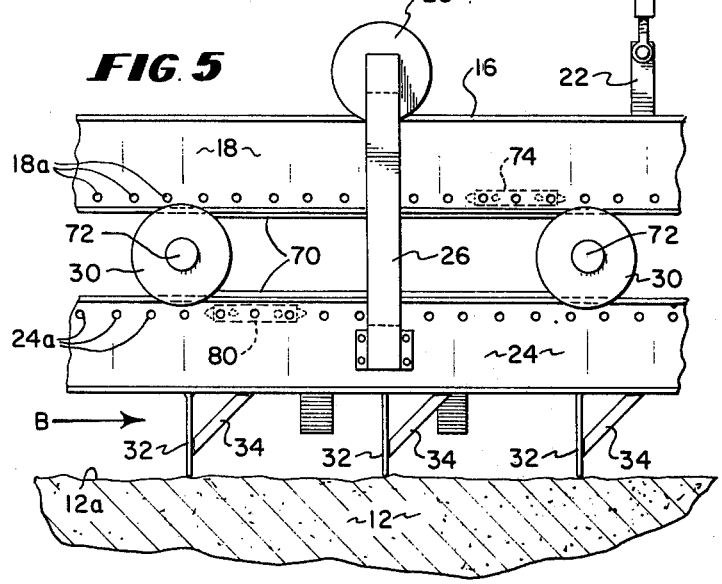
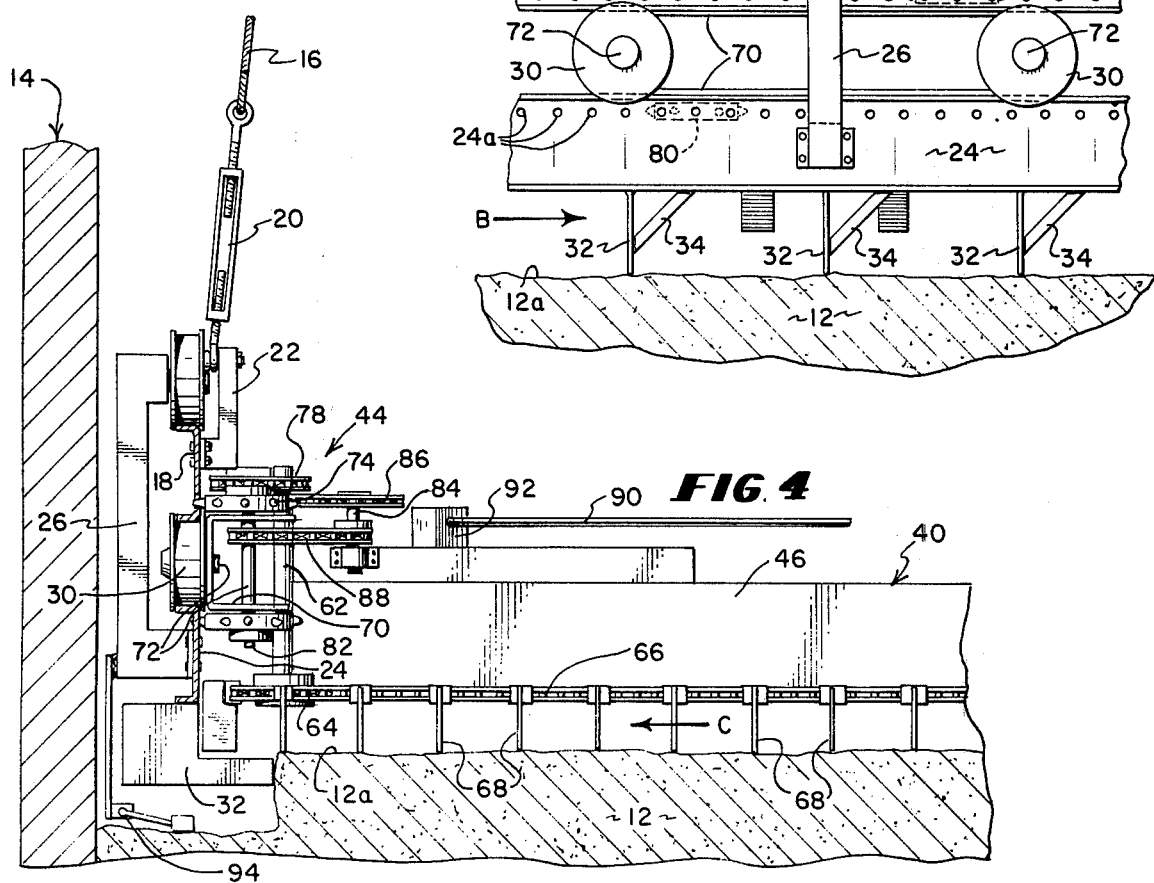

SILAGE HANDLING APPARATUS

The present invention relates to a new and improved silo loader/unloader and more particularly relates to a new and improved apparatus for loading and unloading material such as silage and the like from cylindrical storage bins.

The apparatus in accordance with the invention is useful for evenly distributing silage material conveyed into the upper end of the silo by pneumatic delivery or equivalent means and is also useful in unloading material from the silo by delivering the same into a vertical discharge passage formed in the silage material.

The apparatus in accordance with the present invention provides a number of advantages over the prior art in that only a single electric motor at the center of the mechanism is required and no power wasting forage blower is needed. In addition, a multiple cable suspension system eliminates the need for operational leveling adjustments of the mechanism as the silage is loaded or unloaded. The apparatus has an extremely high capacity flow rate in both a loading and unloading mode. The unit is suitable for use in extra large diameter silos and storage bins and provides for positive traction of the gathering arms around the material. The apparatus insures a level distribution or removal of the silage material during operations for both filling and unloading the silo. Most of the critical moving parts of the drive mechanism are not located in the highly corrosive environment in close proximity to the silage material itself. The use of a plurality of radial arm assemblies permits the use of lighter chains and lower speeds and the apparatus can be controlled for both loading and unloading the silage entirely from the ground. Means is provided for automatically raising and lowering the apparatus within the silo or storage bin as required by the level of material.

The foregoing and other advantages and objects of the present invention are accomplished in a preferred illustrated embodiment which comprises novel apparatus for loading/unloading silage material and the like from cylindrical storage bins and includes a first horizontally stationary ring or track extending around the inside periphery of the silo and supported for vertical movement therein in reference to the level of silage material. A second horizontal ring is supported for rotation relative to the track and includes a plurality of blades for engaging the material in the silo below the track to form a peripheral trench around the inside surface of the silo wall. One or more radial arm assembly extending outwardly of the center of the silo and including drive means adjacent the outer end is provided in driving engagement with the track for rotating the radial arm assembly around the silo in one direction while moving the silage in a radial direction. The outer end drive means is drivingly engaged with the second ring means to drive the ring and blades thereon around the silo in an opposite direction to form the peripheral trench in the silage material. Each radial arm assembly includes an endless chain extending between a sprocket adjacent an inner end and the outer end portion and blades are provided on the chain for engaging the material to move the material in a radial direction as the arm assemblies rotate around the silo. Apparatus is provided for raising and lowering the loader/unloader in reference to the level of material in the silo as the loading/unloading process takes place.

For better understanding of the present invention, reference should be had to the following detailed description taken in conjunction with the drawings in which:

FIG. 1 is a top plan view of a new and improved apparatus for loading/unloading silage material in a cylindrical silo or storage bin and the like;

FIG. 3 is an enlarged plan view adjacent the outer end portion of one of the radial arm assemblies of the apparatus;

FIG. 4 is a fragmentary, enlarged, vertical, sectional view taken substantially along lines 4—4 of FIG. 3; and FIG. 5 is an enlarged, fragmentary, vertical, sectional view taken substantially along lines 5—5 of FIG. 3.

Figure 1:
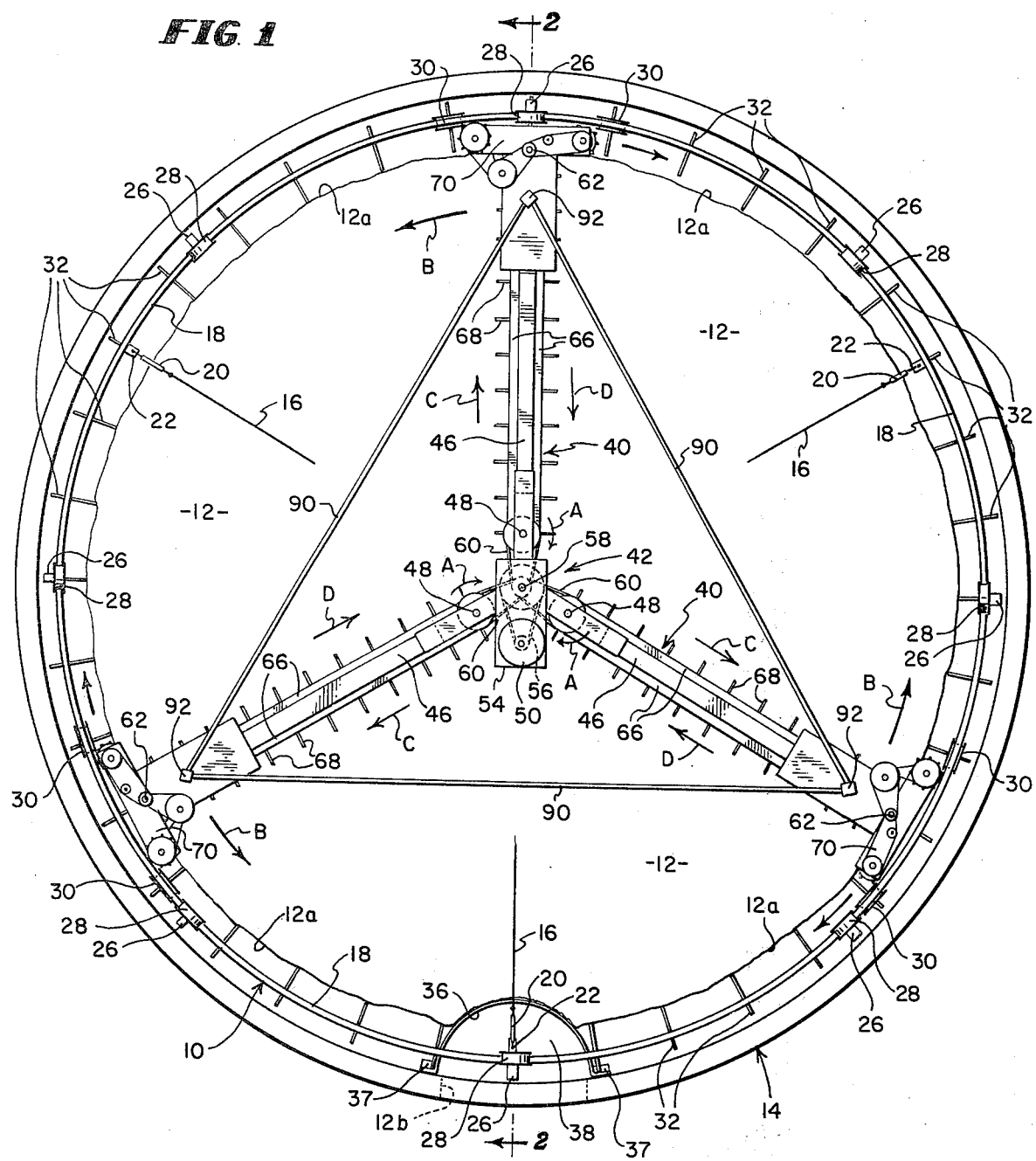
Figure 2:
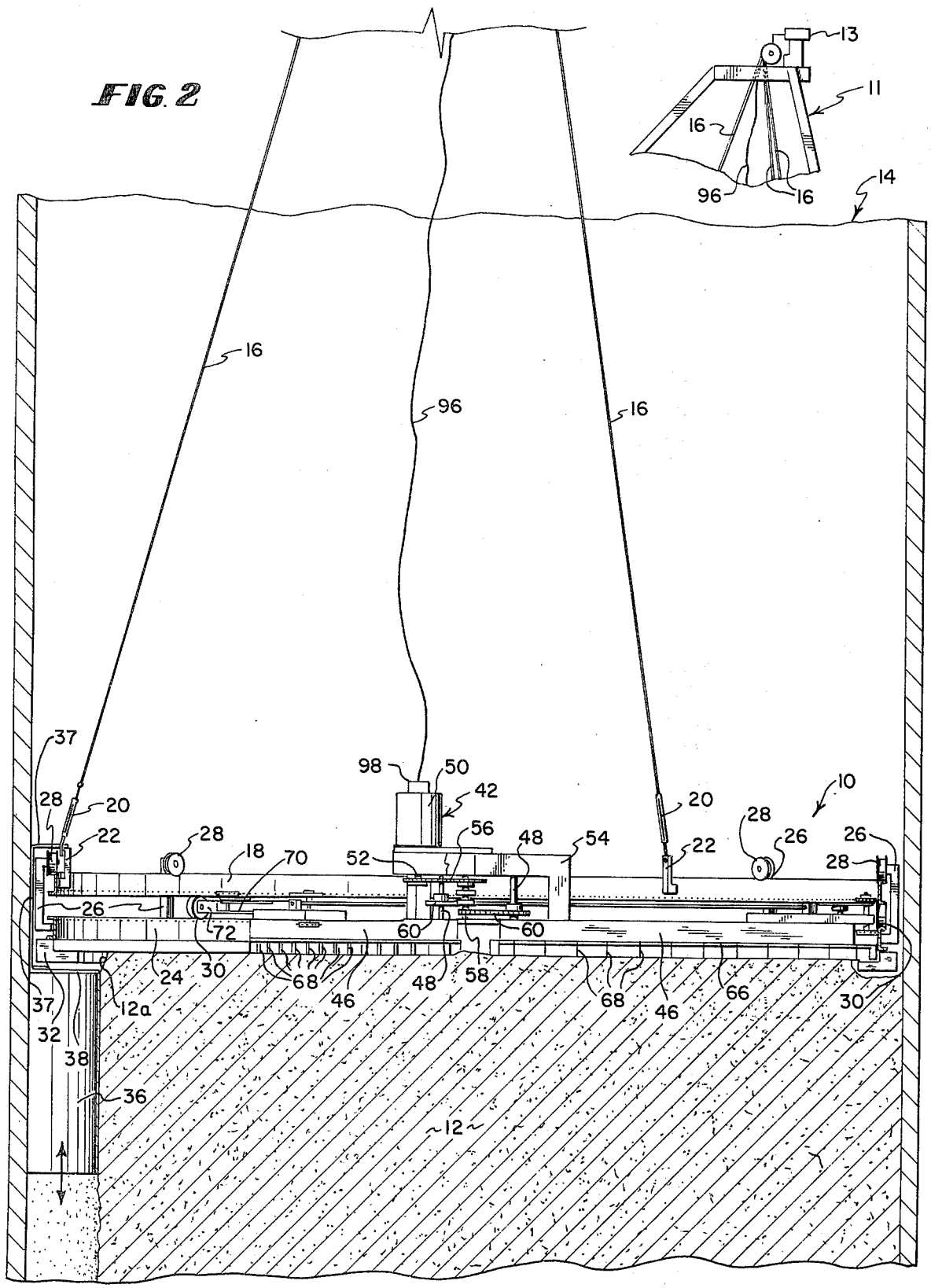
FIG. 2 is a fragmentary, vertical, sectional view taken substantially along lines 2—2 of FIG. 1.

Referring now more particularly to the drawings, in FIGS. 1 and 2 there is illustrated a new and improved silo loader/unloader referred to generally by the reference numeral 10 and adapted to load and unload silage material and the like 12 which is stored in a cylindrical silo 14 having a vertically upstanding peripheral side wall as shown. The loader/unloader 10 is supported from a structure 11 adjacent the upper end of the silo by means of a plurality of flexible cables 16 extending downwardly from a common central support point and sloping radially outwardly and downwardly. The cables are attached at their lower ends to a circular track 18 of channel shape cross-section by means of adjustable turn buckles 20 and suitable attachment brackets 22 as best shown in FIG. 4. The lower ends of the brackets are attached by suitable fasteners to the web of the circular track which has a circumference slightly less than the inside diameter of the silo wall. Because all three of the cables 16 are supported from a common reversible electrical winch 13 on the structure 11 at the center of the silo, the circular track 18 is maintained in a horizontal position after initial adjustment of the track relative to the horizontal is made by means of the turn buckles 20. The winch is energized to raise and lower the track 18 which is stationary with respect to horizontal movement and does not rotate around the silo when the loader/unloader 10 is in operation.

In accordance with the present invention, the silo loader/unloader is provided with a lower circular ring 24 concentric of the track and also of channel shape cross-section. The lower ring is suspended from the track 18 by means of radially spaced brackets 26 having their lower ends secured to the web of the lower ring and rollers 28 journaled at the upper end of the brackets are mounted to ride around the upper flange of the track 18 as best shown in FIGS. 4 and 5. In addition, as shown in FIGS. 1, 3, 4 and 5, intermediate spacer rolls 30 are provided between the upper flange of the lower ring 24 and the lower flange of the upper track 18 to align, support and parallel spacing between the track and ring. The rollers 28 and 30 are provided with flanges on opposite sides which guide the rollers as they run on the horizontal flanges of the ring and track as best shown in FIGS. 4 and 5. The lower ring 24 provides support for a plurality of silage engaging cutter blades 32 which depend downwardly of the ring and which are directed generally radially with respect to the silo. As shown in FIG. 5, the cutter blades may be reinforced with angle braces 34. As the ring 24 rotates, the blades are adapted to cut into the silage adjacent the silo wall forming a peripheral trench 12a in the mass of silage 12 around the periphery as best shown in FIGS. 1 and 2. The peripheral trench formed in the mass of silage in the silo as in communication with a vertical passage or discharge chute 36 formed in the silage mass adjacent the inside surface of the silo wall. The discharge chute comprises a metal chute of semicircular cross-section supported against the silo wall from the track 18 by brackets 37. The engagement of the chute 36 in the upper layer of silage 12 prevents the track 18 from rotation during operation. The chute is held against the silo wall by the silage pressure during the silo filling operation and is raised upwardly with the unloader 10 as the silage level increases. As the chute is raised, the passage in the silage mass formed thereby remains in tact below. As shown in FIG. 1, the chute 36 and passage formed in the silage mass provides communication between the top and the bottom of the silage mass and the lower end of the passage is in communication with a discharge opening (12b - FIG. 2) in the silo wall adjacent the lower end of the silo. In an unloading mode, silage from the peripheral trench 12a falling into the discharge chute 36 will drop downwardly in the passage and discharge out through the opening in the wall at the bottom of the silo. In a loading operation, the chute 36 is closed off at the top by a top 38 which is later removed for a silage discharging or unloading operation. In a discharging operation, the ring blades 32 move the loose silage around the peripheral trench 12a until the silage passes over the open upper end of vertical chute 36 and falls down the passage.

In accordance with the present invention, the silo loader/unloader 10 includes a plurality of radially extending silage arm assemblies, each indicated generally by the reference numeral 40. All of the silage arm assemblies are interconnected adjacent their inner ends at the center of the silo to a single common power source comprising a driving unit 42 (FIGS. 1 and 2). At their outer ends, each arm assembly 40 includes an outer drive assembly 44 (FIGS. 3 and 4) providing driving interconnection between the arm assembly, the stationary track 18 and the lower ring 24. Each arm assembly includes an elongated base 46 and a vertical sprocket and drive shaft 48 is mounted on the base adjacent the inner end. The bases of the respective arm assemblies are structurally interconnected together adjacent the center of the silo to form a base structure for supporting the drive unit 42 which provides power for all of the arm assemblies. As best shown in FIGS. 1 and 2, the drive unit includes an electric gear motor or other prime mover 50 having a vertical output shaft 52 and the gear motor is supported on a base structure 54 attached to the inner ends of the bases 46 of the arm assemblies. The output shaft 52 of the gear motor is drivingly interconnected via a chain and sprocket drive 56 to a vertical drive shaft 58 located at the silo center. The central drive shaft 58 in turn is drivingly interconnected with a plurality of inner end sprocket and shaft 48 of each arm assembly 40 by means of a plurality of chain and sprocket drives 60. When the gear motor 50 is energized, all of the inner end sprocket shaft 48 of the respective arm assemblies 40 are driven at the same appropriately selected speed. As shown in FIG. 1, the inner end sprocket shafts 48 are powered to rotate in a clockwise direction (arrows A) and this causes the outer ends of the arm assemblies to move around the silo wall and track 18 in a counterclockwise direction as indicated by the arrows B. The outer end drive assembly 44 of each silage arm 40 includes an outer end sprocket shaft 62 FIGS. 3 and 4 having a chain sprocket 64 adjacent the lower end. An endless gathering chain 66 is entrained around the sprocket 64 at the outer end of each arm and around the inner end sprocket 48 at the inner end of the arm. As best shown in FIGS. 3 and 4, a plurality of silage cutters or knives 68 depends downwardly from selected links of the gathering chains, and as shown in FIG. 1 these knives engage and move the silage material radially of the silo as the arm assemblies 40 are driven to rotate around the silo and track 18 in a counterclockwise direction as indicated by the arrow B. As shown in FIGS. 2 and 4, the silage cutting knives 68 on the endless chains 66 are spaced at an elevation higher than the ring cutter blade 32 on the rotating ring 24 at the periphery so that the outwardly moving chain cutters 68 dislodge the silage and cause it to fall into the peripheral trench 12a in the silage mass in an unloading operation. As shown in FIG. 1, the arrow C indicates the direction of silage flow caused by the outwardly moving runs of the chains 66 and knives 68 as the arm assemblies 40 move around the silo in a counterclockwise direction. In an unloading mode, the silage knives dig away at the upper surface of the silage mass and loosen the silage to eventually be deposited in the trench 12a. This silage is then moved around the trench by the blades 32 until it falls into the chute 36 for discharge out the opening 12b at the bottom of the silo. The arrows D represent the radially inward direction of movement of the return runs of the gathering chains 66 and the knives 68 on the returning runs do not engage much of the silage because this level of silage has previously been removed from the mass by the knives on the outward runs of the chains which engage the silage in advance of the return runs.

The silage gathering chains 66 provide a power driving interconnection between the inner end sprocket and shafts 48 and the outer end sprocket shafts 62 so that the outer end drive assembly 44 of each arm 40 provides the driving power for rotating the arm around the track 18. The drive assembly also causes the lower ring 24 to be driven in opposite direction around the track.

Referring specifically now to FIGS. 3 and 4, the outer ends of each arm assembly 40 is supported from the lower ring 24 which in turn is supported from the upper track 18. At the outer end of each arm assembly, the drive assembly 44 is provided with a channel shaped base 70 extended transversely of the arm body 46 and at opposite ends each base 70 provides support through a bracket and axle 72 (FIG. 2) for a spacer roll 30 between the track 18 and ring 24. Driving interconnection between each arm assembly and the track 18 is provided by a drive sprocket or cog wheel 74 having radial teeth which engage spaced slots or holes 18a in the web of the track (FIG. 5). The cog wheel 74 is mounted on a shaft 76 which is powered from the shaft 62 by a chain and sprocket drive assembly 78. The sprocket sizes are chosen to provide the desired speed of rotation of the arm assemblies around the track in a counterclockwise direction (arrows B). The lower ring 24 and blades 32 are driven in an opposite direction at the same or different speeds by a lower sprocket or cog wheel 80 having teeth engaging spaced apart slots or holes 24a in the lower ring. The cog wheel 80 is mounted on a shaft 82 which is drivingly interconnected to a jack shaft 84 through a chain and sprocket drive assembly 86. The jack shaft in turn is drivingly interconnected to the outer end sprocket shaft 62 of the arm assembly with a chain and sprocket assembly 88. Appropriately sized sprockets are used in the chain and sprocket assemblies 86 and 88 to effect the desired speed reduction for driving the lower ring 24. The arm assemblies 40 move in a direction opposite that of the lower ring 24 and the speeds of both may be selected as desired to provide equality or differences as needed. Equilateral spacing between the outer ends of the arm assemblies 40 is maintained by engagement of the cog wheels 74 and 80 with the track 18 and ring 24, respectively, and in addition a plurality of tension rods 90 and brackets 92 may be utilized to insure equilateral spacing and continuous meshing between the teeth of the cog wheels and the slots of the track and ring.

In order to raise or lower the apparatus 10 during a loading or unloading operation, respectively, a rail switch 94 (FIG. 4) including an actuator arm sensitive to the upper level of silage is utilized to control the electric winch 13. The apparatus 10 is wired so that in an unloading operation, when the rail switch arm is out of contact with the silage and the apparatus will be lowered a selected amount by the winch 13. In a silage loading operation the apparatus will be raised a selected amount when the silage level engages the rail switch arm. In the loading mode, the silage material is delivered into the silo from the top and falls downwardly around the central portion of the silo. As the arms rotate around the track, the silage is distributed outwardly and any remaining on the knives 68 as they reach the end of the outward runs of the chains 66 falls into the trench 12a. The door 38 of the chute 36 is closed and the silage level in the trench gradually builds up until the arm of the rail switch 94 is actuated and this powers the winch 13 to wind up the cables 16 a preselected amount to raise the level of the loader/unloader 10 in the silo. This process is repeated until the silo 14 is filled to the desired level.

The apparatus 10 is electrically powered via a power cable 96 and slip ring system 98 which energizes the gear motor 50. In an unloading mode, the cutters 32 on the lower ring 24 begin to dig out the trench 12a in the mass of silage 12. This silage is moved around the trench until it falls into the open upper end of the discharge chute 36. The knives 68 on the chains 66 move silage from the upper surface of the silage mass outwardly into the trench as the silage arm assemblies 40 rotate around the ring and the cutter blades 32 on the ring 24 carry the material around the trench for discharge into the chute. When the silage level in the trench 12a recedes and no longer actuates the rail switch, the winch 13 is energized to lower the apparatus a preselected amount and the process is continued as desired until the unloading is completed.

I claim:

1. Apparatus for handling material in cylindrical silos comprising:
    first horizontally stationary ring means forming a track around the inside periphery of said silo mounted for vertical movement therein;
    second horizontal ring means supported for rotation relative to said first ring means and including blade means for engaging the material in said silo below said second ring means forming a peripheral trench in said material around the inside surface of said silo; and
    at least one radial arm assembly extending radially outwardly of the center of said silo and including drive means adjacent the outer end for drivingly engaging said first and second ring means for rotating said arm assembly around said silo in one direction and driving said second ring means around said silo in an opposite direction, said arm assembly including endless chain means extending between the center of said silo and said outer end with knives on links of said chain means for engaging said material for movement thereof in a radial direction in said silo.

2. The apparatus of claim 1 wherein said drive means includes first sprocket means engaging said first ring means and driven from said endless chain means for moving said outer end of said radial arm assembly around said track.

3. The apparatus of claim 2 wherein said drive means includes second sprocket means engaging said second ring means and driven from said endless chain means for moving said second ring around said track in said opposite direction.

4. The apparatus of claim 1 including a plurality of said radial arm assemblies equilaterally spaced and common drive means adjacent inner ends thereof for driving said endless chains to move said material radially of said silo.

5. The apparatus of claim 1 wherein said drive means includes speed changing means for driving said second ring means around said track at a speed different than the outer end of said radial arm assembly moves around said track.

6. The apparatus of claim 1 wherein said drive means includes a toothed sprocket engaging said first ring means and powered from a shaft driven by said endless chain means for moving said arm assembly around said silo.

7. The apparatus of claim 6 wherein said drive means includes a second toothed sprocket engaging said second ring means and powered from a second shaft driven by said endless chain for moving said second ring means around said silo in a direction opposite that of said arm assembly.

8. The apparatus of claim 1 wherein said arm assembly includes roller means adjacent said outer end disposed between said first and second ring means for spacing the same in parallel and supporting the outer end of said arm assembly for rotation relative thereto.

9. The apparatus of claim 1 including support means for supporting said apparatus from a common point adjacent the center of an upper end of said silo, said support means including a plurality of flexible members interconnected adjacent their lower ends with said first ring means and interconnected with a winch adjacent their upper ends.

10. The combination of claim 9 including switch means responsive to the level of material in said silo for energizing said winch to raise/lower said apparatus in said silo.

* * * * *